Sept. 18, 1928.
H. R. C. ANTHONY
DRY BATTERY PACKAGE
Filed Oct. 15, 1926
1,684,856
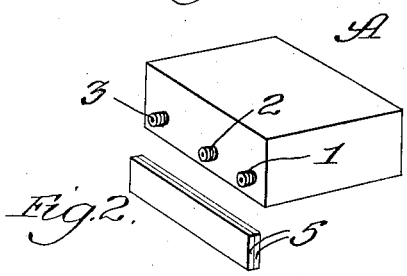
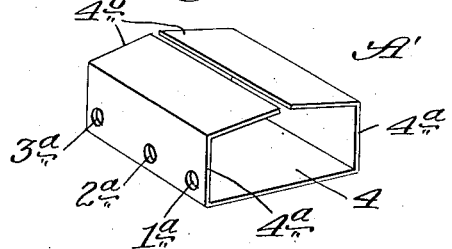
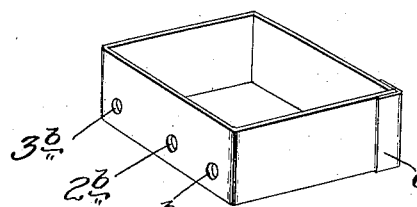
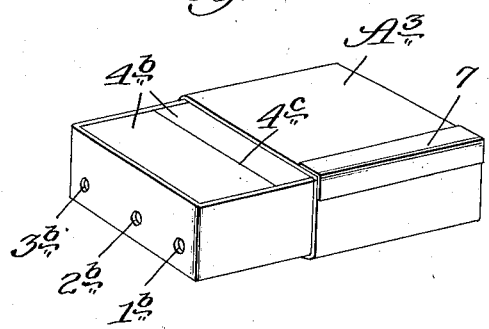
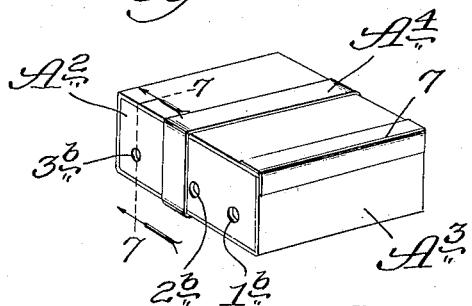
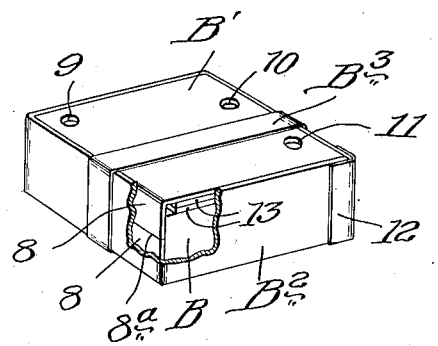
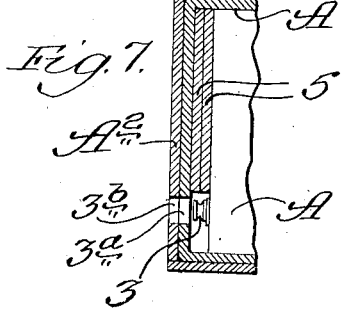
Inventor:
Herman R C Anthony, Patented Sept. 18, 1928.

1,684,856

UNITED STATES PATENT OFFICE.

HERMAN R. C. ANTHONY, OF MADISON, WISCONSIN, ASSIGNOR TO FRENCH BATTERY COMPANY, OF MADISON, WISCONSIN, A CORPORATION OF WISCONSIN.

DRY-BATTERY PACKAGE.

Application filed October 15, 1926. Serial No. 141,762.

This invention relates particularly to a package, or carton wrapping, for dry batteries. The primary object is to provide a package in which a dry battery can be shipped in safety, and by means of which the battery contained in the package may be tested without the necessity of opening, or destroying, the package.

The invention is illustrated in its preferred embodiment in the accompanying drawing, in which—

Fig. 1 represents a perspective view of a dry battery of the upright type, the view showing the battery lying on one side, however; Fig. 2, a perspective view of a pair of strips of cardboard adapted to be placed upon the top edge of the battery, where the battery terminals are located; Fig. 3, a perspective view of the innermost wrapping of the battery; Fig. 4, a perspective view of a second, or intermediate, wrapping which is adapted to be slipped over the wrapping shown in Fig. 3, after the latter has been applied to the battery; Fig. 5, a perspective view illustrating the manner in which the battery, enclosed in the first two wrappings, is inserted in an outer casing which is open at both ends; Fig. 6, a perspective view showing the package complete and the parts of the carton held together by means of a strip of gum tape; Fig. 7, a broken sectional view taken as indicated at line 7 of Fig. 6; and Fig. 8, a perspective view of a dry battery of the horizontal type which is enclosed in a carton provided with openings which register with the battery terminals.

Referring to Figs. 1 to 7 inclusive, A designates a dry battery of the upright type; A', an inner wrapping for the battery; $A^2$, an intermediate wrapping; $A^3$, an outer wrapping; and $A^4$, a band of gum tape securing the parts together.

The battery A is complete in itself and is shown conventionally in Fig. 1 as lying on one of its vertical sides. As is well understood, such a battery comprises any desired number of dry cells electrically connected together and enclosed in a suitable container. In the illustration given, the battery is provided with terminals, or binding posts, 1, 2 and 3, any two of which may be used, depending upon voltage desired.

The wrappings preferably are formed of corrugated cardboard. Each wrapping is in the form of a band. The band A' is provided with perforations $1^a$, $2^a$ and $3^a$ adapted to register with the binding posts; and the band $A^2$ is provided with perforations $1^b$, $2^b$ and $3^b$ adapted to register with the binding posts and with the perforations in the band A'.

The band A' preferably is formed by bending a strip of cardboard into rectangular form to provide one wide side 4, narrow sides $4^a$, and flaps $4^b$ which together form the other wide side of the wrapping, or inner carton-member. The first wrapping is applied to the battery so as to cover the top, the two broad sides, and the bottom, the flaps $4^b$ meeting at the line $4^c$, while the perforations $1^a$, $2^a$ and $3^a$ register with the terminals 1, 2 and 3, respectively, at the top of the battery. Before the wrapping A' is applied, cardboard strips 5 are placed on the top surface of the battery adjacent the terminals.

The band $A^2$ consists of a relatively narrow strip of cardboard bent into rectangular form, the meeting ends of the strip being then secured together by means of an adhesive corner-strip 6, which may be of cloth, or tough paper. The band $A^2$ is of sufficient size to enable it to be slipped over the battery and inner wrapping. When so applied, the long sides of the band $A^2$ cover the top and bottom surfaces of the battery, while the short sides cover the open ends of the inner wrapping and thus cover the vertical end-walls of the battery.

The outer wrapping $A^3$ consists of a wide strip of cardboard bent into rectangular form, the meeting ends of the strip being secured together by an adhesive corner strip 7. The battery with its inner wrapping and intermediate wrapping may be slipped endwise into the open-ended broad band $A^3$ in the manner indicated in Fig. 5; and, after complete insertion, the band of adhesive tape $A^4$ is applied, this band passing about the broad sides of the battery and the top and bottom sides, as shown in Fig. 6. This provides a neat and secure package.

Batteries thus packaged may be tested without removal from the package. This may be done by inserting the terminals of the instrument through the registering perforations, as is obvious. Thus, the purchaser of a battery may be assured at the time of the purchase that the battery has not deteriorated. Also, in case a dealer finds a battery which is below the required voltage, the battery may be returned to the manufacturer.

In this manner, the trouble of removing batteries from their cartons for testing purposes and repackaging the same, if they are to be returned to the manufacturer, is obviated.

In the illustration given in Fig. 8, the battery is of the horizontal type, adapted to rest upon one of its broad sides when it is in use. The battery is designated B. The packaging bands comprise an inner cardboard band B', an outer cardboard band B², and a gum tape band B³. The inner band comprises a wide strip of cardboard bent into rectangular form, the end-portions of this band affording flaps 8 which meet at the line 8ª. One broad side of the inner band B' is provided with perforations 9, 10 and 11 which may be assumed to register with terminals (not shown) with which the battery B is equipped at its upper broad side.

The band B² is composed of a relatively narrow strip of cardboard whose meeting ends are secured together by a vertical corner strip 12 provided with a suitable adhesive. The battery and its inner wrapping B' are forced downwardly into the band B²; and the gum tape band B³ is passed about the top and bottom walls of the inner wrapping B' and vertical walls of the outer wrapping B², so that the package is securely fastened. Before the inner wrapping B' is applied, strips of cardboard 13 are placed on the top of the battery in such a manner as to fill, or partially fill, the spaces between the terminals. Obviously, the battery may be tested without removing it from its carton.

Cartons composed of a plurality of bands housed one within another are preferred, for the reason that various strong and secure packages may be thus provided at moderate cost.

What I regard as new, and desire to secure by Letters Patent, is:

1. A battery package comprising a battery equipped with terminals and a carton consisting of telescopically nested cardboard bands secured together in nested condition by adhesive tape, a wall of said carton being spaced from the terminal-equipped wall of said battery and provided with perforations registering with said terminals and a spacing strip interposed between said walls.

2. A battery package comprising a dry battery equipped at its top wall with terminals, and a carton enclosing said battery comprising an inner band having one wall provided with perforations registering with said terminals, an intermediate band encircling the first-mentioned band and closing the open ends thereof, said intermediate band being provided with perforations registering with said first-mentioned perforations, an outer band telescopically receiving the assembly described, and an adhesive tape securing said bands together in nested condition.

HERMAN R. C. ANTHONY